US009288125B2

(12) United States Patent
Brinza et al.

(10) Patent No.: US 9,288,125 B2
(45) Date of Patent: Mar. 15, 2016

(54) APPLICATION CONTROL OF EMBEDDED WEB CONTENT EXECUTION (71) Applicant: Microsoft Technology Licensing, LLC, Redmond, WA (US)

(72) Inventors: Bogdan Brinza, Bellevue, WA (US); Tony E. Schreiner, Bellevue, WA (US); Tyler M. Barton, Seattle, WA (US); Michael Wayne Jackson, Everett, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 13/918,758

(22) Filed: Jun. 14, 2013

(65) Prior Publication Data
US 2014/0372594 A1 Dec. 18, 2014

(51) Int. Cl.
*H04L 12/26* (2006.01)
*G06F 9/50* (2006.01)
*G06F 17/30* (2006.01)

(52) U.S. Cl.
CPC .............. *H04L 43/08* (2013.01); *G06F 9/5027* (2013.01); *G06F 17/30899* (2013.01)

(58) Field of Classification Search
CPC . G06F 9/5027; G06F 17/30899; H04L 43/08; H04L 67/02
See application file for complete search history.

(56) References Cited

U.S. PATENT DOCUMENTS

| 7,451,450 | B2 | 11/2008 | Sankaranarayan et al. | |
|---|---|---|---|---|
| 8,200,962 | B1 * | 6/2012 | Boodman et al. | 713/161 |
| 8,250,228 | B1 * | 8/2012 | Johansson | 709/231 |
| 8,341,268 | B2 | 12/2012 | Wang et al. | |
| 2007/0061783 | A1 * | 3/2007 | Prakash | 717/127 |
| 2011/0055395 | A1 * | 3/2011 | Wang et al. | 709/226 |
| 2013/0061129 | A1 * | 3/2013 | Liu et al. | 715/234 |

OTHER PUBLICATIONS

Zakas, Nicholas C., "What Determines That a Script is Long-Running?", Published on: Jan. 5, 2009, Available at: http://www.nczonline.net/blog/2009/01/05/what-determines-that-a-script-is-long-running/, p. 1-3.*

"International Search Report & Written Opinion for PCT Application No. PCT/US2013/060761", Mailed Date : Aug. 18, 2014, 11 Pages.

(Continued)

*Primary Examiner* — Brian J Gillis
*Assistant Examiner* — Gil H. Lee
(74) *Attorney, Agent, or Firm* — Bryan Webster; Kate Drakos; Micky Minhas (57) ABSTRACT Web content is displayed concurrently with application content of an application that is hosting the web content. The web content includes at least some content that can be executed or run, such as a script. Performance of the web content is monitored, such as by monitoring the amount of time the web content has been executing and/or an amount of memory used by the web content. Feedback regarding the performance of the web content is provided to the application hosting the web content, and the application can determine whether and/or how to alter execution of the web content based on the performance of the web content. Execution of the web content can be altered in various manners, such as by throttling execution of the web content or ceasing execution of the web content.

20 Claims, 5 Drawing Sheets (56) References Cited

OTHER PUBLICATIONS

Zakas, Nicholas C., "What Determines That a Script is Long-Running?", Published on: Jan. 5, 2009, 3 pages Available at: http://www.nczonline.net/blog/2009/01/05/what-determines-that-a-script-is-long-running/.

"The Firefox Process Model", Published on: Feb. 10, 2009, 3 pages Available at: https://blog.httpwatch.com/2009/02/10/the-firefox-process-model/.

"Following Resource Usage Rules in Apps for Office", Retrieved at <<http://msdn.microsoft.com/en-us/library/fp161035.aspx, Feb. 26, 2013, pp. 9.

Reis, et al., "Using Processes to Improve the Reliability of Browser-based Applications", Retrieved at http://citeseerx.ist.psu.edu/viewdoc/download?doi=10.1.1.136.2646&rep=rep1&type=pdf>>, in White Papers of Software and Web Development, Dec. 2007, pp. 13.

"Overriding Resource Usage Settings for Performance of Apps for Office", Retrieved at <<http://msdn.microsoft.com/en-us/library/fp142258.aspx>>, Jul. 16, 2012, pp. 8.

Osmani, Addy, "Writing Fast, Memory-Efficient JavaScript", Retrieved at <<http://coding.smashingmagazine.com/2012/11/05/writing-fast-memory-efficient-javascript/>>, Nov. 5, 2012, pp. 36.

Moshchuk, et al., "Resource Management for Web Applications in ServiceOS", Retrieved at <<http://research.microsoft.com/pubs/131540/serviceos.pdf>>, in Microsoft TechReport, MSR-TR-2010-56, May 18, 2010, pp. 15.

Chase, et al., "Managing Energy and Server Resources in Hosting Centers", Retrieved at <<http://citeseerx.ist.psu.edu/viewdoc/download?doi=10.1.1.110.5355&rep=rep1&type=pdf>>, in Proceeding of the Eighteenth ACM Symposium on Operating Systems Principles, Oct. 21, 2001, pp. 14.

* cited by examiner

APPLICATION CONTROL OF EMBEDDED WEB CONTENT EXECUTION

BACKGROUND

As computers have become increasingly commonplace, a wide variety of different application have become available. These applications can display content via a user interface of the computer, and the content displayed can be based on data from different sources. Situations can arise, however, where the data from a particular source causes the performance of the application to suffer, such as due to the data being written or designed poorly and resulting in an adverse effect on the application. Such situations can detract from the usability of the application, and result in a frustrating user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, web content embedded in an application is displayed concurrently with content of the application. Performance of the web content is monitored, and feedback is provided to the application regarding the performance of the web content. The application is allowed to alter execution of the web content in response to the feedback.

BRIEF DESCRIPTION OF THE DRAWINGS

The same numbers are used throughout the drawings to reference like features.

DETAILED DESCRIPTION

Application control of embedded web content execution is discussed herein. An application can include embedded web content, also referred to as the application hosting the web content. Both the web content and the content of the application hosting the web content are displayed concurrently. The web content includes at least some content that can be executed or run, such as a script. Performance of the web content is monitored, such as by monitoring the amount of time the web content has been executing and/or an amount of memory used by the web content. Feedback regarding the performance of the web content is provided to the application hosting the web content, and the application can determine whether and/or how to alter execution of the web content based on the performance of the web content. Execution of the web content can be altered in various manners, such as by throttling execution of the web content or ceasing execution of the web content.

Figure 1:
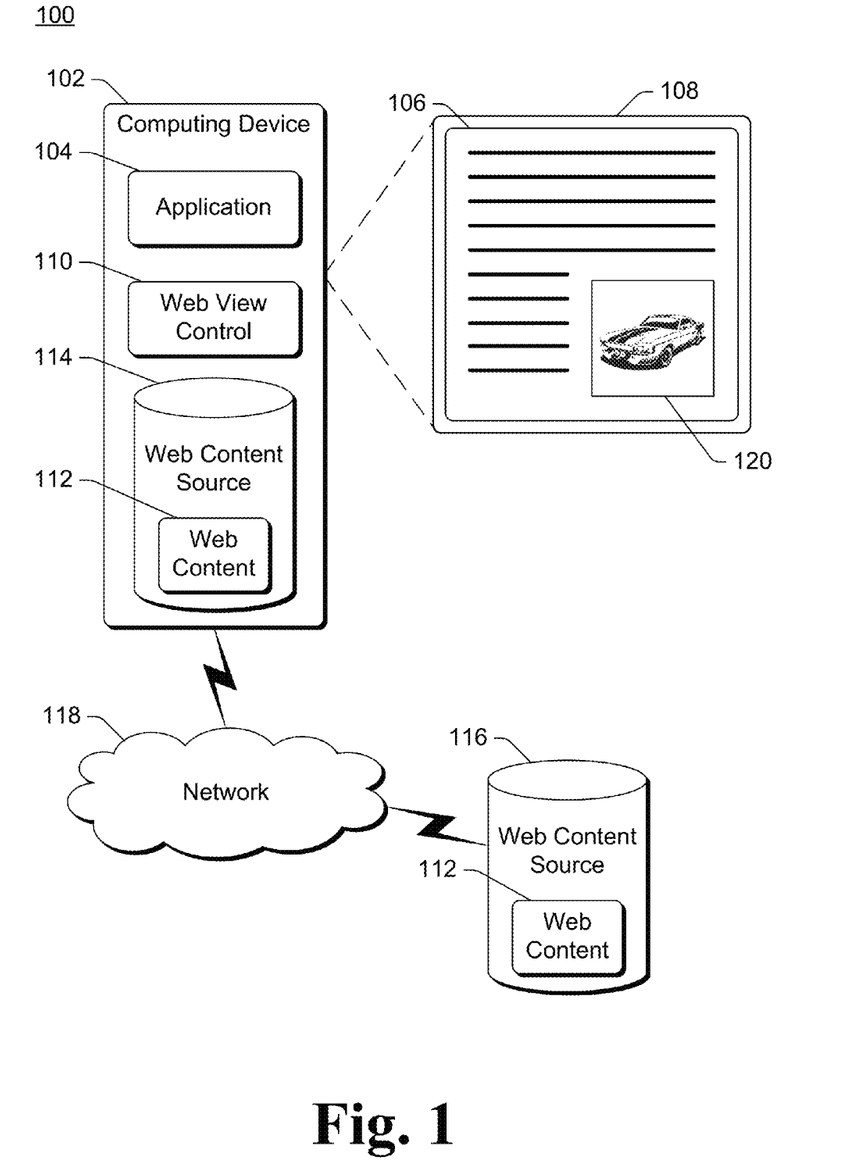
FIG. 1 illustrates an example system implementing the application control of embedded web content execution in accordance with one or more embodiments.

FIG. 1 illustrates an example system 100 implementing the application control of embedded web content execution in accordance with one or more embodiments. System 100 includes a computing device 102, which can be a variety of different types of devices, such as a physical device or a virtual device. For example, the computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 102 can also be a virtual device, such as a virtual machine running on a physical device. A virtual machine can be run on any of a variety of different types of physical devices (e.g., any of the various types listed above). Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes an application 104 that displays application content in a portion 106 of a display device 108. The application content can be any of a variety of different types of content, including images, drawings, text, video, graphs, maps, links, combinations thereof, and so forth. The application content is illustrated as multiple lines (e.g., representing text) in FIG. 1, although it should be noted this is merely an example. The portion 106 can be a window displayed on the display device 108, another segment or area of the display device 108, the entire display area of the display device 108, and so forth. The display device 108 can be included as part of the computing device 102. Alternatively, the display device 108 can be separate from the computing device 102, and the computing device 102 can provide one or more signals to the display device 108 indicating the content and any other user interface elements to be displayed by the display device 108.

The computing device 102 also includes a web view control 110. The web view control 110 obtains web content 112 from one or more web content sources. The web content sources can include a web content source 114 that is local to the computing device 102, such as a fixed or removable storage device of the computing device 102. The web content 112 can additionally or alternatively be obtained from a web content source 116 that is remote from the computing device 102 and accessed by the computing device 102 via a network 118. The network 118 can be any one or more of a variety of different networks, such as the Internet, a local area network (LAN), a public telephone network, an intranet, other public and/or proprietary networks, combinations thereof, and so forth.

The web view control 110 manages display of web content 112 in part of the portion 106, illustrated as a sub-portion 120. The web content 112 is embedded in the application 104, which refers to the web content 112 as to be displayed (e.g., by the web view control 110) concurrently with the application content that is displayed by the application 104. The displayed web content is illustrated as an image of a car in FIG. 1, although it should be noted this is merely an example. The sub-portion 120 can be a window or other area in the portion 106 that is separated from the area of the portion 106 in which the application content is displayed to allow the displayed web content to be distinguished from the displayed application content. Alternatively, the displayed web content can be interspersed with the displayed application content and there may be no visible or user discernible delineation between the displayed application content and the displayed web content.

The web content 112 refers to content that is written in a language that is understandable to applications using the World Wide Web. The web content 112 can include various data, links, executable instructions, and so forth. The web content 112 can be, but need not be, a web page. For example, the web content 112 can include content written in various markup languages, such as HyperText Markup Language (HTML). By way of another example, the web content 112 can include content written in various scripting languages, such as JavaScript.

The web content 112 includes at least some content that can be executed, such as script content (content written in a scripting language). Executing the web content 112 is also referred to as running the web content 112. The content that can be executed can be compiled instructions that are executed, instructions that are interpreted (rather than compiled) and executed, and so forth. The web view control 110 includes an execution engine that executes this content to generate the displayed web content in the sub-portion 120, as discussed in more detail below. The web content 112 can optionally include additional content that is displayed or otherwise presented by the web view control 110, such as images, text, video, and so forth. It should be noted that such additional content can simply be displayed or otherwise presented, and is not executed or otherwise run to generate the display of that additional content. Executing the web content 112 refers to executing that part of the web content 112 that can be executed.

Figure 2:
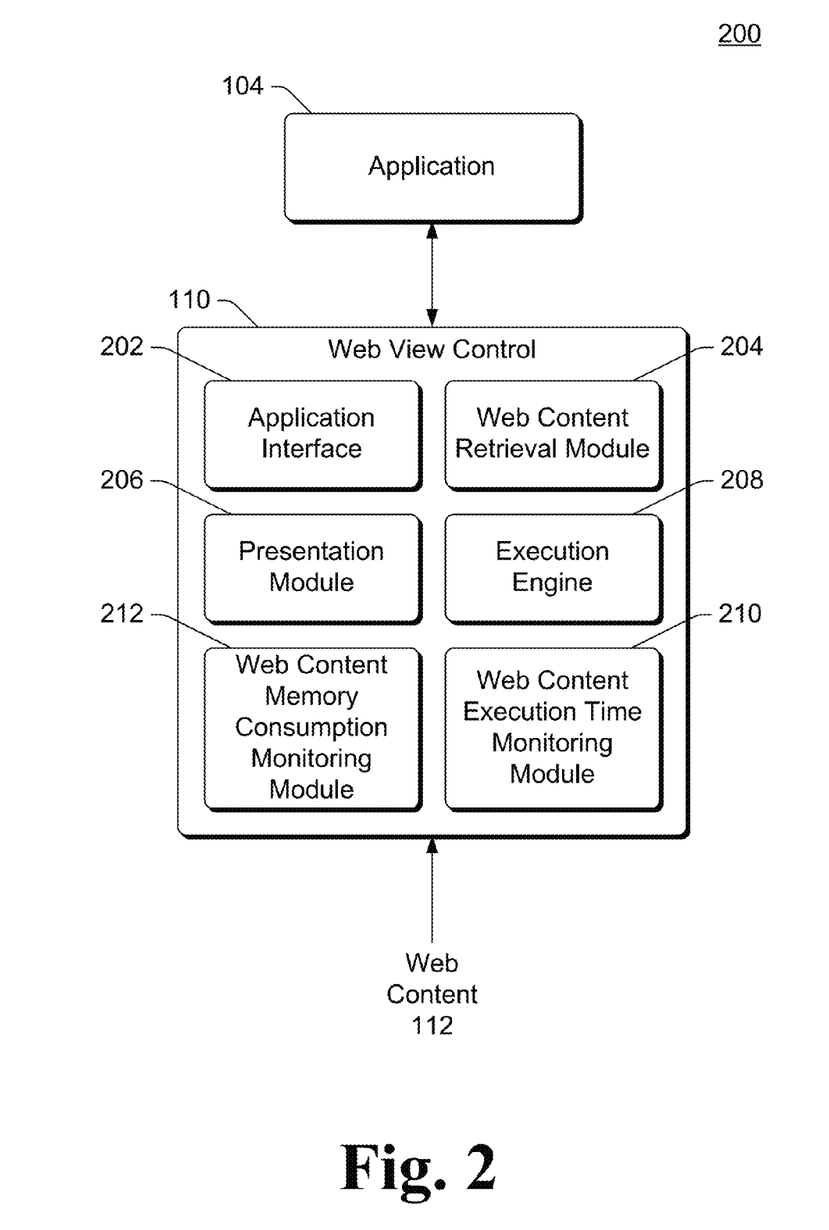
FIG. 2 illustrates another example system implementing the application control of embedded web content execution in accordance with one or more embodiments.

FIG. 2 illustrates an example system 200 implementing the application control of embedded web content execution in accordance with one or more embodiments. The system 200 includes the application 104 and the view control 110 as discussed above. The web view control 110 includes an application interface 202, a web content retrieval module 204, a presentation module 206, an execution engine 208, a web content execution time monitoring module 210, and a web content memory consumption monitoring module 212. The web view control 110 can be implemented in software, firmware, hardware, or combinations thereof.

Generally, during operation of the system 200, the application 104 provides to the web view control 110 a request to display or otherwise present the web content 112. The web content retrieval module 204 retrieves or otherwise obtains the web content 112 from a web content source, and makes appropriate portions of the web content 112 available to the presentation module 206 and the execution engine 208. The presentation module 206 displays or otherwise presents some of the web content 112 (e.g., text, images, etc.), and the execution engine 208 executes the web content 112. The result of executing portions of the web content 112 can be displayed or otherwise presented by the execution engine 208 and/or by the presentation module 206, which is also referred to as displaying the web content 112.

The application interface 202 is a mechanism via which the application 104 can request that web content be displayed by the web view control 110. To have the web view control 110 display web content, the application 104 can provide an indication of the web content to be displayed to the application interface 202. The indication can be provided in different manners, such as by invoking a method of an application programming interface (API) exposed by the application interface 202. Alternatively, rather than the application 104 providing an indication of the web content to be displayed, the web content to be displayed can be identified in other manners, such as by the web view control 110 being configured with an indication of the web content, by the application 104 itself providing the web content 112 to the web view control 110, by the web view control 110 being configured with or obtaining from elsewhere an indication of the web content source and how to identify the web content associated with the application 104, and so forth.

The execution engine 208 executes the web content 112. In one or more embodiments, the execution engine 208 (and optionally other modules or interfaces of the web view control 110) is running in a same process as the application 104. For example, the execution engine 208 can be a script engine running in the same process as the application 104. Alternatively, the execution engine 208 can be running in a separate process from the application 104.

Because the application content and the web content are displayed concurrently, performance problems with the web content can create the appearance that the application 104 is performing poorly. Thus, the web view control 110 monitors the performance of the web content 112 that is executed by the execution engine 208, and provides feedback to the application 104 regarding the performance of the web content. Various different performance aspects of execution of the web content 112 can be monitored as discussed in more detail below. The web view control 110 also allows the application 104 to alter the execution of the web content 112. The alteration of the execution of the web content 112 can be performed in a variety of different manners as discussed in more detail below.

In one or more embodiments, monitoring the performance of the web content 112 that is executed by the execution engine 208 includes monitoring an amount of time that the web content 112 has been executing (e.g., how long the web content has been running). The web content execution time monitoring module 210 monitors the execution of the web content 112 by the execution engine 208, keeping track of the amount of time that the web content 112 has been executing. This monitoring of the amount of time that the web content 112 has been executing is also referred to as web content (or script) governance.

The execution time monitoring module 210 can determine the amount of time that the web content 112 has been executing in various manners. In one or more embodiments, the execution time monitoring module 210 is attached to another task or operation that is performed at regular or irregular intervals by the execution engine 208. For example, such a task may be execution of an instruction, execution of a particular type of instruction, garbage collection (e.g., collecting objects that can be freed) being performed by the execution engine 208, and so forth. In response to the other task being performed (or it being time for the other task to be performed), the execution time monitoring module 210 determines the amount of time that the web content 112 has been executing. For example, the execution time monitoring module 210 can keep a record of a time when the execution engine 208 began executing the web content 112. The execution time monitoring module 210 can then readily determine the amount of time that the web content 112 has been executing by determining the time difference between the current time and the time when the execution engine 208 began executing the web content 112. The execution time monitoring module 210 can alternatively determine the amount of time that the web content 112 has been executing in other manners, such as by applying various heuristics or rules based on a number of instructions that have been executed, a number of other tasks that have been performed (e.g., how many times garbage collection has been performed by the execution engine 208), and so forth.

The execution time monitoring module 210 can provide an indication to the application 104 at regular or irregular intervals of the amount of time that the web content 112 has been executing. The timing of when to provide the indication to the application 104 can be determined in various manners, such as at a particular interval (e.g., approximately every 250 milliseconds), in response to other events or tasks being performed (e.g., every third time garbage collection is performed by the execution engine 208), in response to a request for the indication from the application 104, and so forth. This indication provided to the application 104 can be an explicit indication of the amount of time (e.g., a number of milliseconds) that the web content 112 has been executing.

The execution time monitoring module 210 can provide indications to the application 104 of how long the web content 112 has been executing for as long as the web content 112 is executing, and then can cease providing such indications to the application 104. The execution time monitoring module 210 can optionally provide to the application 104 an indication that the web content 112 has ceased executing, or alternatively the application 104 can infer that the web content 112 has ceased executing if no indications of the how long the web content 112 has been executing are received from the execution time monitoring module 210 for at least a threshold amount of time. If executing of the web content 112 were to subsequently resume, the execution time monitoring module 210 can resume providing indications to the application 104 how long the web content 112 has been executing (optionally resetting the amount of time the web content 112 has been executing each time the web content 112 resumes executing after having ceased executing for at least a threshold amount of time).

Alternatively, rather than determining the amount of time that the web content 112 has been executing, the execution time monitoring module 210 can simply determine whether the web content 112 is still executing. This determination can be made at regular or irregular intervals analogous to the discussion above regarding determining an amount of time that the web content 112 has been executing, but without determining the amount of time. The execution time monitoring module 210 can then provide an indication to the application 104 at regular or irregular intervals of whether the web content 112 is still executing. The timing of when to provide the indication to the application 104 can be determined in various manners, such as at a particular interval (e.g., approximately every 250 milliseconds), in response to other events or tasks being performed (e.g., every third time garbage collection is performed by the execution engine 208), and so forth. The application 104 can then determine how long the web content 112 has been executing based on how long the application 104 has received indications from the execution time monitoring module 210 that the web content 112 is still executing.

The execution time monitoring module 210 can continue to provide to the application 104 indications at regular or irregular intervals of whether the web content 112 is still executing. Alternatively, the execution time monitoring module 210 can cease providing such indications when execution of the web content 112 ceases, notifying the application 104 that execution of the web content 112 has stopped but not continuing to provide indications to the application 104 that the executing of the web content 112 has stopped. If execution of the web content 112 were to subsequently resume, the execution time monitoring module 210 can resume providing indications to the application 104 that the web content 112 is executing.

In other embodiments, the application 104 provides an execution time trigger value to the web view control 110. The execution time trigger value is an indication of an amount of time, and if the web content 112 executes for an amount of time that satisfies the execution time trigger value (e.g., executes for at least the execution time trigger value amount of time) then the execution time monitoring module 210 notifies the application that executing of the web content 112 has satisfied the execution time trigger value (e.g., that the web content 112 has been executing for at least the execution time trigger value amount of time). The amount of time that the web content 112 has been executing can be determined by the execution time monitoring module 210 in a variety of different manners as discussed above. Thus, the execution time monitoring module 210 can monitor how long the web content 112 has been executing, but does not notify the application 104 of how long the web content 112 has been executing unless the web content 112 has been executing for at least a particular amount of time.

In one or more embodiments, monitoring the performance of the web content 112 that is executed by the execution engine 208 includes monitoring an amount of memory that is used by the web content 112. The web content memory consumption monitoring module 212 monitors the amount of memory that the web content 112 uses or consumes (e.g., the amount of memory that has been allocated to the web content 112 and/or the execution engine 208 by a memory manager of the computing device implementing the system 200).

The memory consumption monitoring module 212 can determine the amount of memory used by the web content 112 in various manners. In one or more embodiments, the web content 112 is maintained by the web view control 110 in a data structure, such as a document object model (DOM), having multiple elements. The memory consumption monitoring module 212 can traverse the data structure, identifying the amount of memory allocated to each of the multiple elements, and adding together the amounts of memory allocated to each of the multiple elements. The sum of the amounts of memory allocated to each of the multiple elements is the amount of memory used by the web content 112. Alternatively, the amount of memory used by the web content 112 can be determined in other manners, such as by monitoring memory allocation requests made by the web content 112 and/or the execution engine 208, and the granting of such requests.

The timing of when the memory consumption monitoring module 212 determines the amount of memory used by the web content 112 can be determined in various manners. In one or more embodiments, the memory consumption monitoring module 212 is attached to another task or operation that is performed at regular or irregular intervals by the execution engine 208. For example, such a task may be execution of an instruction, execution of a particular type of instruction, garbage collection (e.g., collecting objects that can be de-allocated) being performed by the execution engine 208, and so forth. In response to the other task being performed (or it being time for the other task to be performed), the memory consumption monitoring module 212 determines the amount of memory that the web content 112 is using.

The memory consumption monitoring module 212 can provide an indication to the application 104 at regular or irregular intervals of the amount of memory that the web content 112 is using. The timing of when to provide the indication to the application 104 can be determined in various manners, such as at a particular interval (e.g., approximately every 250 milliseconds), in response to other events or tasks being performed (e.g., every third time garbage collection is performed by the execution engine 208), in response to a request for the indication from the application 104, and so forth. This indication can be an explicit indication of the amount of memory (e.g., a number of megabytes) that the web content 112 is using. This indication can optionally be provided along with other indications, such as an indication provided by the web content execution time monitoring module 210 of how long the web content 112 has been executing.

The memory consumption monitoring module 212 can provide indications to the application 104 of the amount of memory that the web content 112 is using for as long as the web content 112 is executing and/or being displayed, and then can cease providing such indications to the application 104.

In other embodiments, the application 104 provides a memory usage trigger value to the web view control 110. The memory usage trigger value is an indication of an amount of memory, and if the web content 112 uses an amount of memory that satisfies the trigger value (e.g., uses at least the memory usage trigger value amount of memory) then the memory consumption monitoring module 212 notifies the application that the web content 112 has satisfied the memory usage trigger value (e.g., that the web content 112 is using at least the memory usage trigger value amount of memory). The amount of memory used by the web content 112 can be determined by the memory consumption monitoring module 212 in a variety of different manners as discussed above. Thus, the memory consumption monitoring module 212 can monitor the amount of memory that the web content 112 uses, but does not notify the application 104 of the amount of memory that the web content 112 uses unless the web content 112 uses at least a particular amount of time.

In response to indications provided by the web view control 110 (e.g., the web content memory consumption monitoring module 212 and/or the web content execution time monitoring module 210), the application 104 can provide indications to the web view control 110 of how to alter execution of the web content 112. The execution of the web content 112 can be altered in a variety of different manners. By indicating to the web view control 110 when and/or how to alter execution of the web content 112, the application 104 is able to control execution of the web content.

In one or more embodiments, execution of the web content 112 is altered by terminating execution of the web content 112. The application 104 sends a request or other indication to the web view control 110 to cease executing the web content 112, and in response the execution engine 208 stops executing the web content 112. Ceasing executing the web content 112 can optionally include removing the web content 112 from the memory of the system, also referred to as unloading the web content 112 (e.g., deleting the web content 112, freeing memory allocated to the web content 112 and/or the execution engine 208, etc.). It should be noted that although the application 104 may send a request to the web view control 110 to cease executing the web content 112, the application 104 can subsequently send a request to the web view control 110 to resume executing the web content 112. In response to a request to resume executing the web content 112, the execution engine 208 resumes executing the web content 112 (e.g., assuming the web content 112 is still in memory or can otherwise be obtained by the web view control 110).

Alternatively, the execution of the web content 112 can be altered in other manners. For example, the application 104 can throttle execution of the web content 112. The application 104 sends a request or indication to the web view control 110 to throttle execution of the web content, and in response the execution engine 208 alternates between executing and not executing (e.g., starting and stopping) the web content 112. For example, the execution engine 208 may alternate between executing the web content for 200 milliseconds and not executing the web content for 100 milliseconds, between executing the web content for 200 milliseconds and not executing the web content for 500 milliseconds, and so forth. The amount of time that the web content 112 is to be executed can be determined in a variety of different manners, such as being configured in the execution engine 208, being identified to the web view control 110 by the application 104, and so forth.

Whether execution of the web content 112 is altered, and/or how execution of the web content 112 is to be altered, can be determined by the application 104 in a variety of different manners. In one or more embodiments, the application 104 includes or otherwise obtains one or more rules or criteria that are applied to determine whether and/or how to alter execution of the web content 112. These rules or criteria can include various factors, such as the amount of time the web content 112 has been executing, an amount of memory used by the web content 112, how long the application 104 has been executing, an amount of memory used by the application 104, an amount of memory used by other applications in the system 200, and so forth.

In one or more embodiments, the application 104 can also prompt a user of the system 200 regarding whether and/or how to alter execution of the web content 112. For example, the user may be notified that the web content 112 has been executing for a long amount of time (optionally specifying to the user approximately how long the web content 112 has been executing), the user may be notified that the web content 112 is using a lot of memory (optionally specifying to the user approximately how much memory the web content is using 112), and so forth. A user input can then be received indicating whether and/or how to alter execution of the web content 112.

In the discussions herein, reference is made to the web view control 110 monitoring the performance of web content, providing feedback to the application 104 regarding the performance of the web content, and optionally altering the execution of the web content. In one or more embodiments, this monitoring, providing feedback, and optional altering of execution can be performed for multiple different web content concurrently. For example, the application 104 may embed first web content from one source and second web content from the same or different source. The first and second web content can both be displayed concurrently with the application content, and the web view control 110 can monitor, provide feedback, and optionally alter execution of the first web content and the second web content individually. E.g., the application 104 could determine to terminate execution of the second web content but not alter execution of the first web content.

Figure 3:
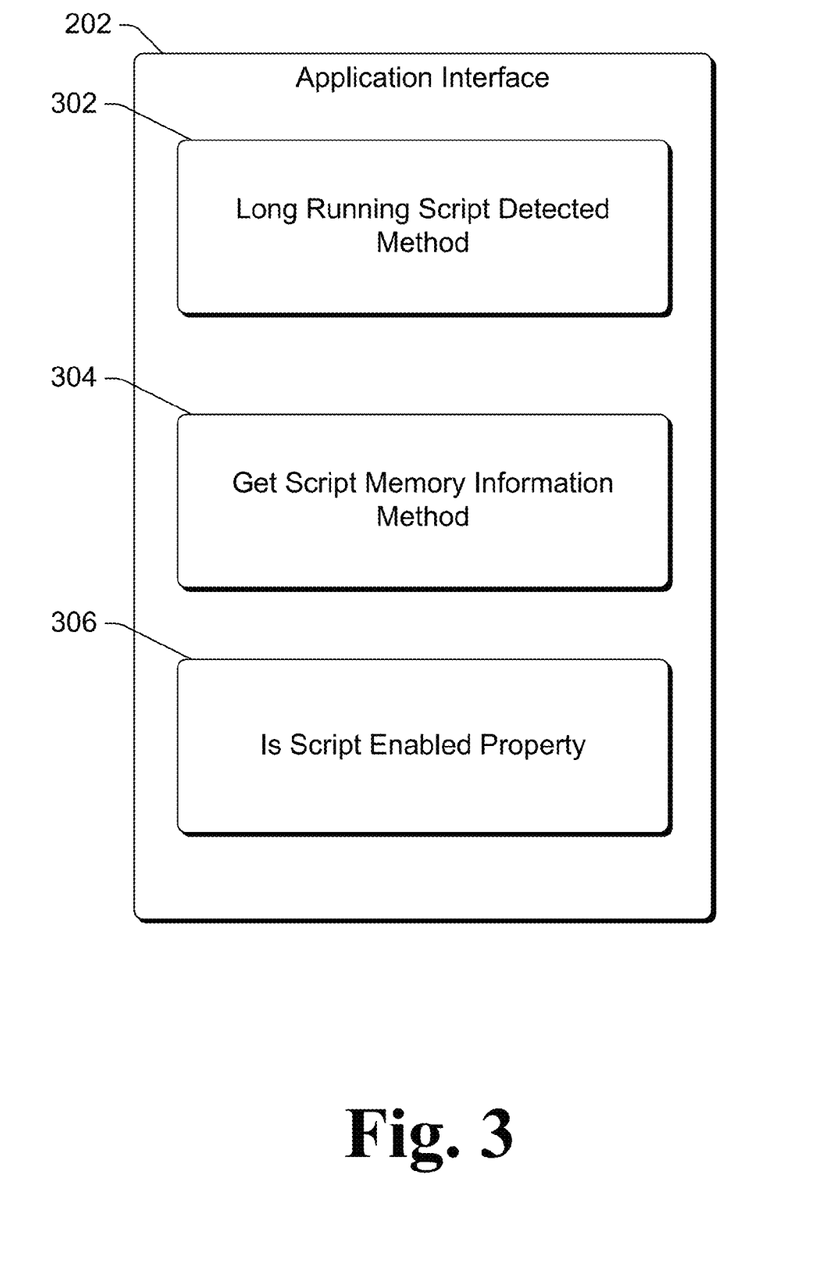
FIG. 3 illustrates an example application interface in accordance with one or more embodiments.

FIG. 3 illustrates an example application interface 202 in accordance with one or more embodiments. In the illustrated example of FIG. 3, the application interface 202 is an API of the web view control 110 discussed above, and includes a long running script detected method 302, a get script memory information method 304, and an is script enabled property 306. It should be noted that the application interface 202 is an example, and that the interface 202 need not include all of the elements and/or properties illustrated, and/or can include additional elements and/or properties.

The long running script detected method 302 is invoked by the application (e.g., the application 104 discussed above) to provide a callback function to the web view control. The long running script detected method 302 includes a parameter that is the callback function of the application. The web view control calls the callback function of the application to provide an indication of the amount of time that web content has been executing. The callback function can take as a parameter, for example, the amount of time that the web content has been executing, and return a value indicating whether to cease execution of the web content or continue execution of the web content. Alternatively, the callback function need take no parameters, and/or may return other values such as no return value, an indication of whether execution of the web content is to be throttled, an amount that execution of the web content is to be throttled (e.g., allowed to execute 60% of the time, such as alternate between executing for 60 milliseconds and not executing for 40 milliseconds), an indication to unload the web content from memory, and so forth.

The get script memory information method 304 is invoked by the application (e.g., the application 104 discussed above) to request an amount of memory that the web content is using. The get script memory information method 304 can be a function including no parameters, and returns an indication of the amount of memory that the web content is using (e.g., a number of megabytes). Alternatively, the get script memory information method 304 can be implemented in other manners, such as invoked by the application to provide a callback function to the web view control, and the web view control can call that callback function of the application to provide an indication of the amount of memory that the web content is using, analogous to the long running script detected method 302 discussed above.

The is script enabled property 306 is a property of the web view control indicating whether execution of web content (e.g., execution of scripts) is enabled or disabled. The property 306 can be read by the application (e.g., the application 104 discussed above) to determine whether execution of web content by the web view control is currently enabled or disabled. The property 306 can also optionally be set or written by the application, allowing the application to specify whether execution of web content by the web view control is to be enabled or disabled.

Figure 4:
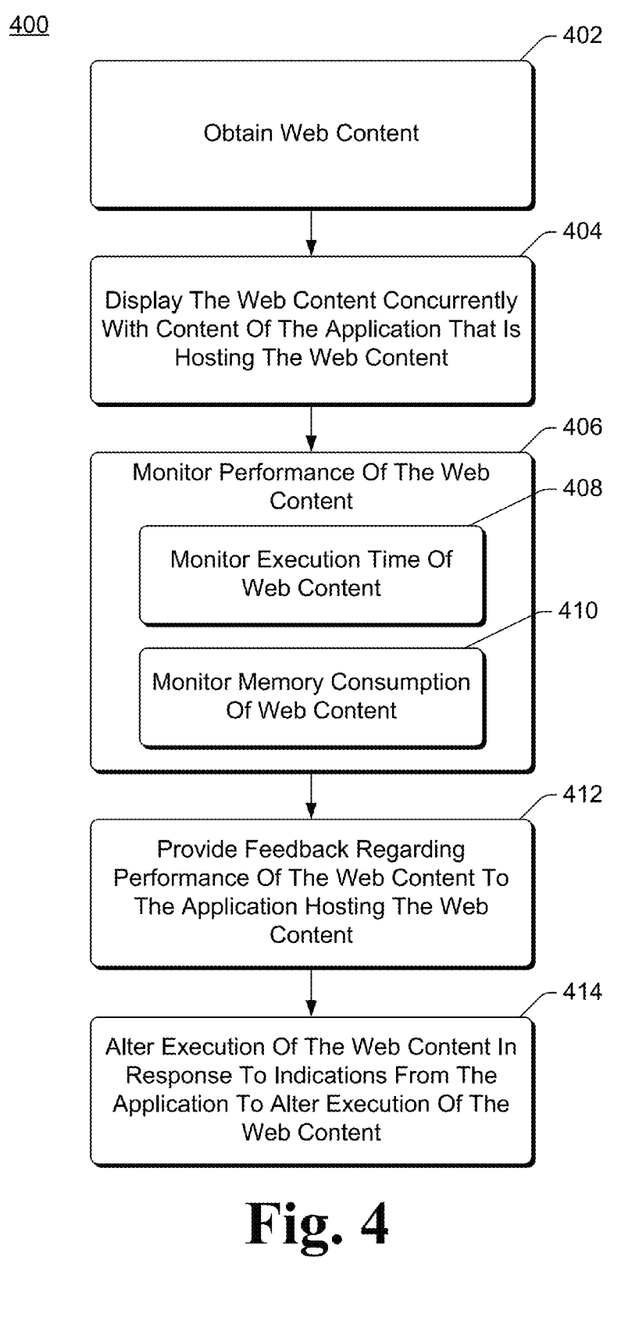
FIG. 4 is a flowchart illustrating an example process for implementing application control of embedded web content execution in accordance with one or more embodiments.

FIG. 4 is a flowchart illustrating an example process 400 for implementing application control of embedded web content execution in accordance with one or more embodiments. Process 400 is carried out by a web view control, such as the web view control 110 discussed above, and can be implemented in software, firmware, hardware, or combinations thereof. Process 400 is shown as a set of acts and is not limited to the order shown for performing the operations of the various acts. Process 400 is an example process for implementing application control of embedded web content execution; additional discussions of implementing application control of embedded web content execution are included herein with reference to different figures.

In process 400, web content is obtained (act 402). The web content can be obtained from various sources as discussed above, and includes at least some content that can be executed or run.

The web content is displayed concurrently with application content of the application that is hosting the web content (act 404). The application hosting the web content is the application in which the web content is embedded. The web content is displayed by displaying any images, text, or other displayable content included in the web content, as well as displaying the result of the execution or running of the web content that can be executed or run (e.g., executing one or more scripts included in the web content).

Performance of the web content is monitored (act 406). Performance of the web content can be monitored in a variety of different manners. For example, performance of the web content can be monitored by monitoring the amount of time the web content is executed (act 408) as discussed above. Additionally or alternatively, performance of the web content can be monitored by monitoring an amount of memory used (consumed) by the web content (act 410) as discussed above.

Feedback regarding the performance of the web content is provided to the application hosting the web content (act 412). The feedback can be provided in a variety of different manners as discussed above, such as an indication of how long the web content has been executing, an indication of whether the web content is still executing, an indication of an amount of memory consumed by the web content, and so forth.

Execution of the web content can be altered based on indications from the application (act 414). These indications are typically in response to the feedback provided in act 412, but can alternatively be in response to other actions or events. Execution of the web content can be altered in various manners as discussed above, such as ceasing execution of the web content, throttling execution of the web content, unloading the web content from memory, and so forth. It should be noted that no indication need be received from the application in response to the feedback provided in act 412, in which case no alteration of execution of the web content need be performed in act 414. For example, the application can determine based on the feedback provided in act 412 that no alteration of execution of the web content is desired, and provide no indication of such to the web view control in which case the web view control continues execution of the web content.

The techniques discussed herein support various usage scenarios. For example, an application can embed web content that is displayed concurrently with the application content, and determine if the web content is using too much memory or includes a script that is executing for too long. If the application determines that the web content is using too much memory or includes a script that is executing for too long, the application can terminate execution of the script and/or have the web content unloaded from memory. By way of another example, an application can embed web content that is displayed concurrently with the application content, and determine if the web content is using too much memory or includes a script that is executing for too long. If the application determines that the web content is using too much memory or includes a script that is executing for too long, the application can notify a user of the system that the web content is using a lot of memory or executing for a long time. The user is thus notified that perceived performance problems may be attributable to the web content rather than the application itself, and the user can be given the opportunity to terminate execution of the web content.

Although particular functionality is discussed herein with reference to particular modules, it should be noted that the functionality of individual modules discussed herein can be separated into multiple modules, and/or at least some functionality of multiple modules can be combined into a single module. Additionally, it should be noted that a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
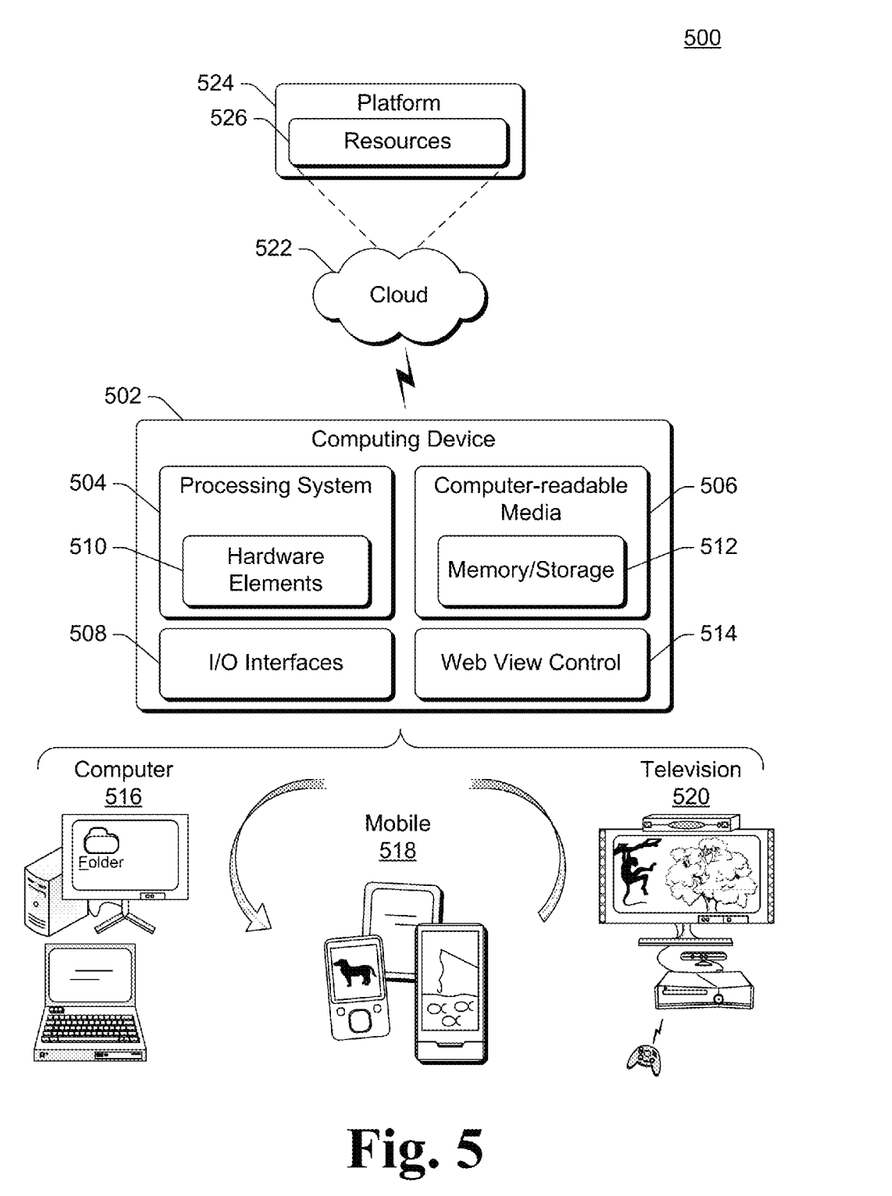
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a web view control 514. Web view control 514 can be, for example, a web view control 110 as discussed herein.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining multiple instances of web content, at least one of the multiple instances of web content including a script;
    displaying the multiple instances of web content embedded in an application concurrently with content of the application, including displaying a result of execution of the script, the multiple instances of displayed web content each having a different source;
    receiving, from the application, a trigger value;
    monitoring an amount of time the script has been executing against the trigger value;
    providing feedback to the application regarding performance for each of the respective multiple instances of displayed web content responsive to the trigger value being satisfied for as long as the web content is executing;
    allowing the application to alter execution of the web content in response to the feedback, the allowing the application to alter execution of the web content comprising terminating execution of a first instance of the displayed web content without altering execution of a second instance of the displayed web content; and
    ceasing to provide feedback to the application regarding performance for the first instance of web content when the first instance of web content is no longer executing.

2. A method as recited in claim 1, the monitoring comprising monitoring performance of the script when executing the script.

3. A method as recited in claim 1, the monitoring comprising monitoring performance of the script when executing the script, and to alter execution of the web content is to throttle execution of the script.

4. A method as recited in claim 1, the providing feedback to the application including providing feedback regarding an amount of memory that is used by the web content.

5. A method as recited in claim 1, wherein to alter execution of the content is to terminate execution of the web content while continuing to display the content of the application.

6. A method as recited in claim 1, an execution engine executing at least part of the web content running in a same process as the application.

7. A method as recited in claim 1, the providing feedback comprising providing feedback to the application in response to a request from the application for the feedback.

8. A method as recited in claim 1, the providing feedback comprising sending to the application, at regular or irregular intervals, an indication of the performance of the web content.

9. A method as recited in claim 8, the indication comprising an amount of time that the web content has been executing.

10. A method as recited in claim 8, the indication comprising an amount of memory being used by the web content.

11. A method as recited in claim 1, further comprising a memory usage trigger value, and the providing feedback comprising providing feedback to the application indicating that the web content is using at least the memory usage trigger value amount of memory.

12. A method comprising:
  obtaining multiple instances of web content, at least one of the multiple instances of web content including a script;
  concurrently displaying both application content and the multiple instances of web content embedded in the application content, including displaying a result of execution of the script, the multiple instances of displayed web content each having a different source;
  monitoring an amount of time the script has been executing;
  providing, at regular or irregular intervals, one or more indications of performance for each of the respective multiple instances of displayed web content to the application, including at least indications of how long the script has been executing;
  sending a notification to the application when the one or more indications of performance satisfy a trigger value;
  receiving a termination indication to terminate execution of the script from the application; and
  terminating execution of one or more of the multiple instances of displayed web content in response to the termination request from the application without altering execution of another instance of web content.

13. A method as recited in claim 12, the providing one or more indications comprising sending, at regular or irregular intervals, one or more indications of the performance of at least one of the multiple instances of web content.

14. A method as recited in claim 13, the performance of the at least one of the multiple instances of web content further including an amount of memory being used by the web content.

15. A method as recited in claim 12, the trigger value further comprising a memory usage trigger value, and the providing feedback further comprising providing the one or more indications to the application if at least one of the multiple instances of web content is using at least the memory usage trigger value amount of memory.

16. A method as recited in claim 12, further comprising:
  receiving a throttling indication to throttle execution of the script from the application; and
  throttling execution of the script.

17. A computing device comprising:
  one or more processors;
  a computer-readable storage medium having stored thereon multiple instructions that, responsive to execution by the one or more processors, cause the one or more processors to perform acts comprising:
  obtaining multiple instances of web content, at least one of the multiple instances of web content including a script;
  concurrently displaying both application content and the multiple instances of web content embedded in the application content, including displaying a result of execution of the script, the multiple instances of displayed web content each having a different source;
  monitoring an amount of time the script has been executing;
  providing to the application, at regular or irregular intervals, one or more indications of performance for each of the respective multiple instances of displayed web content, including at least indications of how long the script has been executing;
  sending a notification to the application when the one or more indications of performance satisfy a trigger value;
  receiving a termination indication to terminate execution of the script from the application; and
  terminating execution of the script in response to the termination indication from the application without altering execution of another instance of web content.

18. A computing device as recited in claim 17, the trigger value comprising a memory usage trigger value, and the sending the notification comprising sending the notification when the web content is using at least the memory usage trigger value amount of memory.

19. A computing device as recited in claim 17, the trigger value comprising an execution time trigger value, and the sending the notification comprising sending the notification when the web content has been executing for at least the execution time trigger value amount of time.

20. A computing device as recited in claim 17, web content including one or more of an image, text, and a video to be displayed by the computing device.

* * * * *